Figure 1:
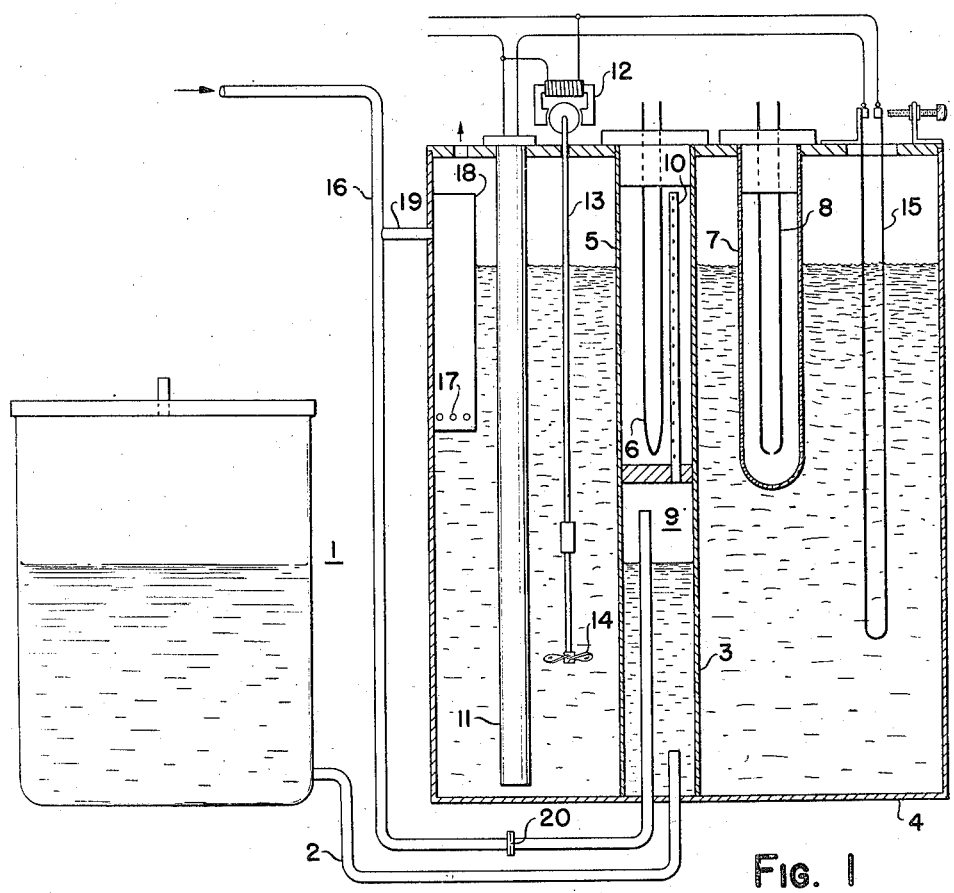

June 2, 1942.    C. JOHNSON    2,285,280
GAS ANALYZER
Filed Oct. 12, 1938

Inventor
CLARENCE JOHNSON
By Raymond W. Junkins
Attorney

Patented June 2, 1942

2,285,280

UNITED STATES PATENT OFFICE 2,285,280

GAS ANALYZER

Clarence Johnson, Cleveland Heights, Ohio, assignor to Bailey Meter Company, a corporation of Delaware Application October 12, 1938, Serial No. 234,666

7 Claims. (Cl. 23—255)

My invention relates to a means for measuring or determining the intensity of a chemical reaction, and thus to indicate the concentration of one of the reacting constituents. My invention has the particular application to indicate the proportion of a gas present in a mixture of gases.

It is an object of my invention to provide a simple, reliable and accurate instrument which will measure and indicate readily and quickly the proportion of free oxygen present in the gaseous products of combustion and to control therefrom the fuel and/or air input.

Another object is to provide for a continuous indication of the concentration of a reactive substance in a gaseous mixture.

Still another object is to provide an inexpensive apparatus that is readily applied to the purpose specified.

In practicing my invention I provide in an electric circuit a Wheatstone bridge having catalysts in two legs. The catalysts may be of any metal capable of reacting with or aiding the reaction of a mixture of methanol vapor and oxygen. I have found and used copper, bronze, gold, Monel metal, platinum, palladium and various alloys of platinum, as platinum-iridium, platinum-rhodium, etc., as satisfactory catalysts. I have found, however, that a catalyst of platinum is preferable; however the invention may be carried through with any of those mentioned. One of the legs of the bridge containing a catalyst is enclosed in a detector chamber through which is diffused the mixture of methanol vapor and flue gas, while the other leg has a standard or comparison cell or chamber which is filled with an inert gas. From an initial balanced circuit any difference thereafter in temperature occurring in the detector chamber will cause an unbalancing of the circuit, and that difference is measurable as a value of oxygen content contained in the gaseous mixture.

If desired, greater sensitivity may be had by correcting for the thermal conductivity of $CO_2$ gas in the mixture by allowing the flue gas to pass through the non-reacting cell. However, it has been found that the effect of thermal conductivity of the $CO_2$ gas is so very small as to have practically no effect upon the recorded value of oxygen.

It is known that the reaction between methanol vapor and oxygen becomes exothermic once started. This is true only if oxygen is available above a predetermined minimum. Flue gases very seldom carry a constant excess of free oxygen and the amount of free oxygen varies considerably over a short period of time. So to prevent the failure of the reaction due to lack of oxygen and thus having the temperature of the catalyst drop below that necessary to continue the reaction when an increase of oxygen does appear I maintain constantly a minimum temperature to avoid such failure by allowing a certain amount of electric current to flow through the catalyst to produce the temperature desired.

The mixture of methanol vapor and flue gas must be quite thorough. Such thoroughness is obtained by maintaining a very close temperature control of the methyl alcohol so as to produce a predetermined constant amount of evaporation. Then having also a predetermined amount of flue gas to mix with the methanol vapor such mixture going into the detector changer to be diffused about the catalyst so as to furnish a uniform reaction over the entire effective area of the catalyst, the increase in heat due to such reaction between the gaseous mixture and the catalyst will cause an increase in the temperature of the catalyst, unbalancing the circuit, such degree of unbalance will then be read as a value of the oxygen content.

In the accompanying drawing Fig. 1 is a simplified diagrammatic and sectional view of the preferred apparatus.

Figure 2:
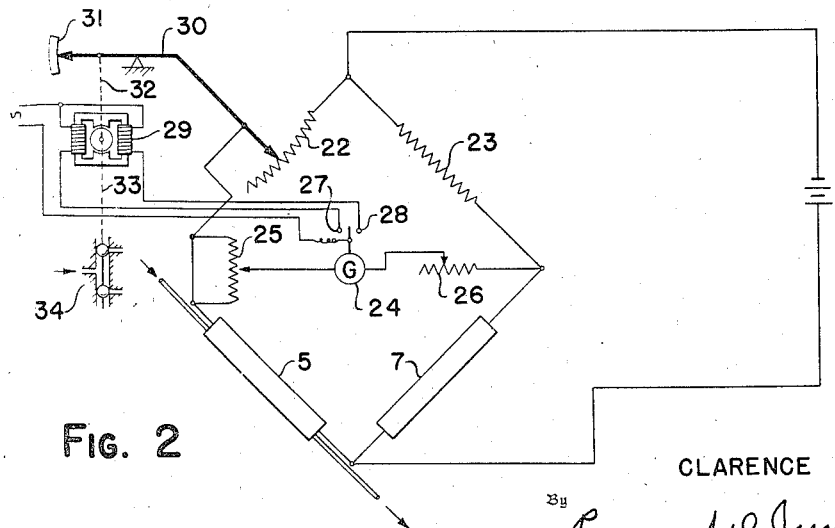

Fig. 2 represents a circuit diagram embodying a Wheatstone bridge.

Referring to Fig. 1, I show therein a supply of methyl alcohol in container 1. This container is connected by a pipe 2 to a central cylinder 3 in a cabinet 4 where a certain desired depth of methyl alcohol is maintained. For convenience, at a substantial distance above the methyl alcohol are located detector chamber 5 containing a platinum catalyst 6 and adjacent to it the standard cell 7 filled with inert gas and with a similar catalyst 8. It is understood that these two cells need not be so placed, but may be outside of the cabinet 4. From the space above the methyl alcohol, to be known as the mixing chamber 9, and into the detector tube 5 runs a perforated pipe 10 capable of conducting the mixture of methanol vapor and flue gas about the catalyst 6 so as to insure the diffusion of the mixture over the greatest effective area of the catalyst.

A definite mixture is maintained by controlling the flow of flue gas, and the amount of vapor given off by the alcohol. As to the latter amount, it is a function of area of evaporation and temperature. The smaller the area the higher the temperature must be. In this instance, the cabinet 4 preferably surrounding the tube 5 is filled with a desirable liquid such as dibutyl phthalate having a low vapor pressure, which in turn is heated by a heating element 11 immersed in it. To insure a uniform temperature of the liquid an agitator consisting of motor 12, shaft 13, and propeller blades 14 constantly stirs it. The degree of temperature desired is maintained by a bi-metal thermostat 15 which is electrically interconnected with the heating element 11, and both in turn to a common power source.

Flue gas, controlled by any desirable method, flows through pipe 16, through the measuring orifice 20, thence into the mixing chamber 9 where it is intermixed with methanol vapor. Any excess amount of flue gas will flow through pipe 19 into excess chamber 18, thence through the orifices 17 at the base of the chamber 18 and through the liquid into the atmosphere as indicated by the arrow. Flue gas may enter the mixing chamber through the methyl alcohol, or it may enter immediately above it. I show it entering above the methyl alcohol. The mixture of flue gas and methanol vapor from the mixing chamber 9 goes through the diffusing pipe 10, which is located adjacent the catalyst 6 so as to insure the greatest effectiveness of the reaction, and to the atmosphere.

Referring now to the wiring diagram in Fig. 2, I show therein schematically a Wheatstone bridge having a leg 6 in tube 5 through which the gas mixture constantly flows, and a leg 8 in standard tube 7 filled with inert gas, such as nitrogen. I also show a galvanometer 24 sensitive to unbalance in the circuit, and adapted to cause a rebalancing of same.

In the wiring diagram I show the catalyst 6 encased by reaction chamber 5 opposite a balancing resistance 22, tube 7 has catalyst 8 in inert gas and is offset by resistance 23. Across the bridge is a galvanometer 24 interconnecting the oppositely balanced sides. A shunt 25 is had for purposes of increasing or decreasing the sensitivity of the circuit. Governing the strength of a current flowing through the circuit is rheostat 26. The galvanometer's deflection will make contact with either contact 27 or 28 completing a circuit in which is located a reversible motor 29. The reversible motor will revolve in the direction dictated by the galvanometer deflection. As motor 29 revolves, it moves pointer 30 relative to index 31 by means of linkage 32 interconnecting motor 29 and arm 30.

Oxygen in the flue gas going through the reaction chamber 5 will react with the methanol vapor in the presence of the heated catalyst 6 and through varying the resistance of 6 cause movement of the galvanometer 24 in the direction of either contact 27 or 28. The galvanometer 24 making such contact will cause the reversible motor 29 to rotate in a dictated direction indicating by means of arm 30 the amount of oxygen on the index 31. As the index arm 30 moves it will in turn position its other end on the resistance 22 bringing the system into balance, thus causing the galvanometer to assume a neutral position again.

From the description of the operation of the apparatus it can be seen that it may be used for control purposes where it is desired to maintain a certain amount of air necessary for best combustion. This is readily accomplished by maintaining the flow of air in correspondence to the desired oxygen content in the flue gas. The reversible motor 29 in its rotation will cause by linkage 32 to move indicating arm 30 relative index 31 giving the value of oxygen in the mixture passing through chamber 5. At the same time the motor will cause linkage 33 to move air pilot valve 34 if and when the arm 30 deviates in either direction from a desired value as shown by index 31. The air pilot valve in turn creates a fluid loading pressure which may move a corrective agent (not shown) either increasing or decreasing the amount of air supply.

While I have illustrated and described a particular embodiment of my invention, I wish it to be understood that I am not to be limited thereby, that it may assume various forms and that I am to be limited only by the scope of the attached claims in view of prior art.

What I claim as new, and desire to secure by Letters Patent of the United States, is:

1. In combination, a vessel having a source of supply of flue gas and methyl alcohol, a chamber therein for evaporating a constant quantity of alcohol vapor for union with any probable amount of free oxygen in the flue gas, a mixing chamber for the flue gas and vapor, a detector cell, a vertically suspended catalyst in said detector cell, a conduit adjacent the extent of the catalyst interconnecting the detector cell and the mixing chamber, said conduit having a multiplicity of apertures evenly spaced over its length said apertures uniformly spreading the gaseous mixture over the catalyst, a second cell filled with inert gas having a similar catalyst, heating means for both cells maintaining a predetermined temperature, and indicating means responsive to the temperature relation between the cells.

2. In a device for indicating the concentration of a constituent gas of a gaseous mixture, a suspended metallic U-shaped substance contained in said device disposed to said gaseous mixture, a conduit adjacent said metallic substance having a number of evenly spaced apertures allowing the flow of the gaseous mixture therethrough, a second metallic substance disposed to an inert gas, means for heating said metallic substances to maintain a predetermined relation therebetween when no chemical reaction takes place of the gaseous mixture, and means responsive to the difference in the electrical resistance between the two metallic substances measuring the rate of chemical reaction of said gaseous mixture and indicating quantitatively the concentration of the constituent gas.

3. In an apparatus for quantitatively determining oxygen content in gaseous mixtures, a source of test gas, a source of combustible gas for union with any free oxygen in said test gas, a mixing chamber for said gases, a detector chamber, a catalyst detector suspended in said chamber, a conduit joining said mixing chamber with said detector chamber and positioned adjacent said catalytic detector, said conduit having a plurality of spaced apertures directed toward the adjacent catalytic detector for distributing the gas uniformly over said catalytic detector, heating means for said detector, said detector effecting a chemical union between the free oxygen and said added combustible gas, and an indicator for indicating changes in said detector member caused by the heat of reaction as a measure of oxygen content.

4. The combination in an apparatus for quantitatively determining the oxygen content in a gaseous mixture comprising, a source of gas for oxygen determination, a combustible fuel generating chamber, said combustible fuel upon generation admixed to said gas, a mixing chamber for said gas and combustible fuel, a detector chamber, a suspended catalyst detector in said detector chamber, heating means for said detector, a conduit joining said mixture chamber and said detector chamber extending substantially the length of said detector and having a plurality of spaced apertures for distributing the gas uniformly over the detector, said detector effecting a reaction between the free oxygen in the gaseous mixture and added combustible, and means measuring the intensity of said reaction indicating the oxygen content of said gaseous mixture.

5. In combination, a vessel having a source of supply of flue gas and liquid fuel, a chamber therein for evaporating a constant quantity of the liquid fuel vapor for union with any probable amount of free oxygen in the flue gas, a mixing chamber for the flue gas and vapor, a detector cell, a vertically suspended catalyst in said detector cell, a conduit adjacent the extent of the catalyst interconnecting the detector cell and mixing chamber, said conduit having a multiplicity of apertures evenly spaced over its length said apertures uniformly spreading the gaseous mixture over the catalyst, a second cell filled with inert gas having a similar catalyst, heating means for both cells maintaining a predetermined temperature, and indicating means responsive to the temperature relation between the cells.

6. In combination, a vessel having a source of supply of flue gas and a liquid fuel, a chamber therein for evaporating a constant quantity of liquid fuel vapor for union with any probable amount of free oxygen in the flue gas, a mixing chamber for the flue gas and vapor, a detector cell, a vertically suspended catalyst in said detector cell, a conduit adjacent the extent of the catalyst interconnecting the detector cell and mixing chamber, said conduit having a multiplicity of apertures evenly spaced over its length said apertures uniformly spreading the gaseous mixture over the catalyst, a second cell filled with inert gas having a similar catalyst, heating means for both cells maintaining a predetermined temperature, a Wheatstone bridge circuit including both cells, and indicating means responsive to the unbalance of the said Wheatstone bridge.

7. In a gas analyzer, in combination, an analyzer cell, a vertically positioned catalyst in said cell, a conduit entering the bottom of the cell and extending upwardly adjacent the catalyst, said conduit being substantially coextensive with the catalyst and provided with many uniformly spaced apertures facing said catalyst for spreading the gaseous mixture to be analyzed evenly over the catalyst, and means for feeding said gaseous mixture under constant pressure into said conduit.

CLARENCE JOHNSON.

CERTIFICATE OF CORRECTION.

Patent No. 2,285,280.  June 2, 1942.

CLARENCE JOHNSON.

It is hereby certified that error appears in the printed specification of the above numbered patent requiring correction as follows: Page 2, second column, lines 48 and 49, claim 2, for "in the electrical resistance between the two" read --in electrical resistances of the two--; and that the said Letters Patent should be read with this correction therein that the same may conform to the record of the case in the Patent Office.

Signed and sealed this 8th day of September, A. D. 1942.

(Seal)

Henry Van Arsdale,
Acting Commissioner of Patents.